(12) United States Patent
Colgan et al.

(10) Patent No.: US 6,713,786 B2
(45) Date of Patent: Mar. 30, 2004

(54) THIN FILM TRANSISTORS WITH SELF-ALIGNED TRANSPARENT PIXEL ELECTRODE

(75) Inventors: Evan G. Colgan, Chestnut Ridge, NY (US); Kai R. Schleupen, Yorktown Heights, NY (US); Takatoshi Tsujimura, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/348,288

(22) Filed: Jan. 21, 2003

(65) Prior Publication Data

US 2003/0138995 A1 Jul. 24, 2003

Related U.S. Application Data

(62) Division of application No. 09/730,218, filed on Dec. 5, 2000, now Pat. No. 6,511,869.

(51) Int. Cl.[7] .............................................. H01L 29/04
(52) U.S. Cl. ........................... 257/59; 257/72; 257/759
(58) Field of Search ........................... 349/43, 42, 138, 349/110, 122, 111; 257/59, 72, 595, 762, 642, 759; 345/92

(56) References Cited

U.S. PATENT DOCUMENTS

| | | | | | |
|---|---|---|---|---|---|
| 5,550,066 A | * | 8/1996 | Tang et al. | .................... | 438/29 |
| 5,976,902 A | * | 11/1999 | Shih | ............................. | 438/30 |
| 5,989,944 A | * | 11/1999 | Yoon | ........................... | 438/149 |
| 6,100,954 A | * | 8/2000 | Kim et al. | ................... | 349/138 |
| 6,188,452 B1 | * | 2/2001 | Kim et al. | ..................... | 349/43 |
| 6,211,928 B1 | * | 4/2001 | Oh et al. | ....................... | 349/43 |
| 6,243,146 B1 | * | 6/2001 | Rho et al. | ..................... | 349/42 |
| 6,338,988 B1 | * | 1/2002 | Andry et al. | ............... | 438/158 |
| 6,403,407 B1 | * | 6/2002 | Andry et al. | ............... | 438/158 |
| 6,429,058 B1 | * | 8/2002 | Colgan et al. | ............. | 438/158 |
| 6,511,869 B2 | * | 1/2003 | Colgan et al. | ............. | 438/149 |

* cited by examiner

*Primary Examiner*—Carl Whitehead, Jr.
*Assistant Examiner*—Laura M Schillinger
(74) *Attorney, Agent, or Firm*—Robert M. Trepp; Benjamin M. Halpern

(57) ABSTRACT

A pixel cell has a thin film transistor structure formed on a substrate. A signal conductor is patterned on the thin film transistor structure, and a first patterned layer of a transparent conductive material covers the signal conductor. The first patterned layer provides a pattern employed in etching a channel region of the thin film transistor structure. A dielectric layer is formed over the pixel cell and includes a via hole down to the first patterned layer of the transparent conductive material. A second layer of transparent conductive material extends through the via hole to contact the first patterned layer wherein the second layer is self-aligned to the transistor structure.

18 Claims, 8 Drawing Sheets

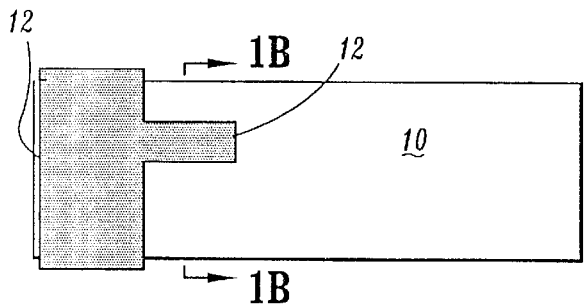
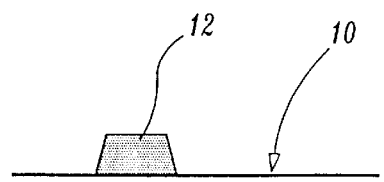
FIG. 1A  FIG. 1B
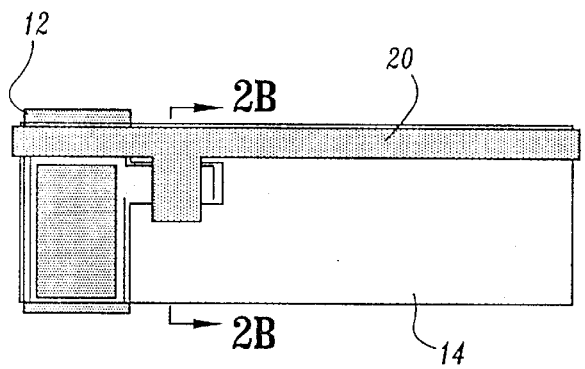
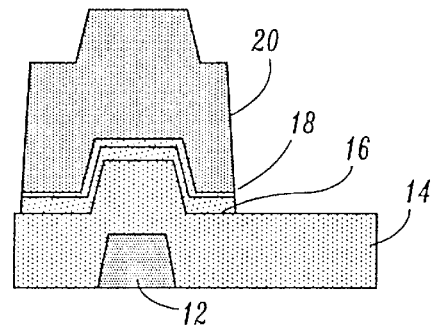
FIG. 2A  FIG. 2B
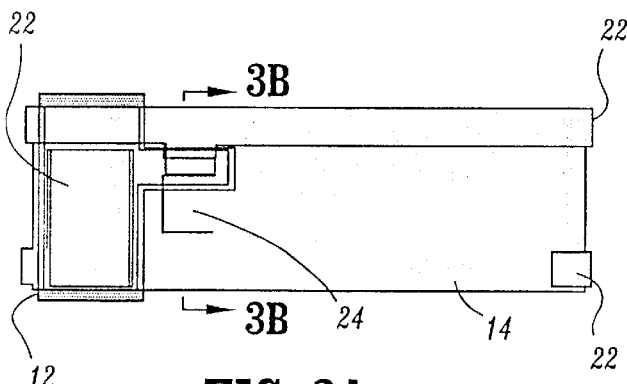
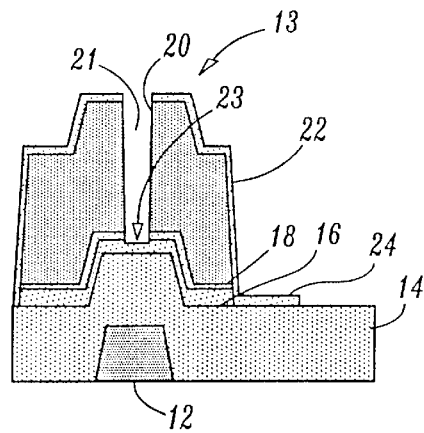
FIG. 3A  FIG. 3B

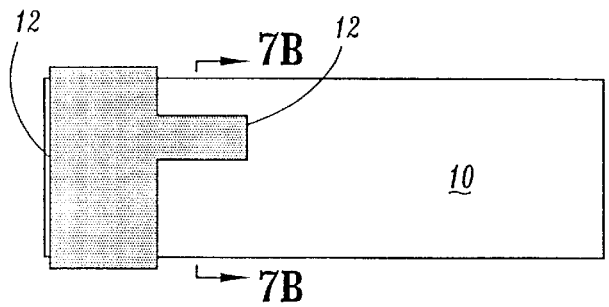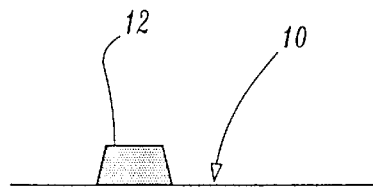
FIG. 7A　　FIG. 7B
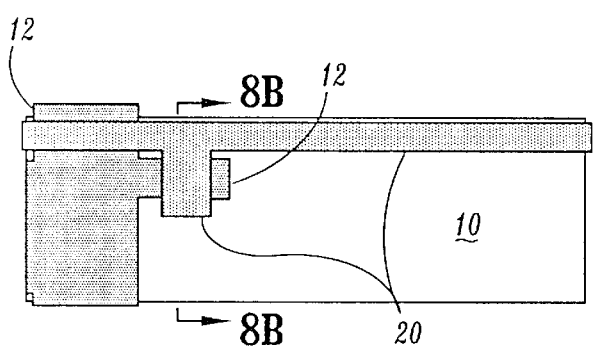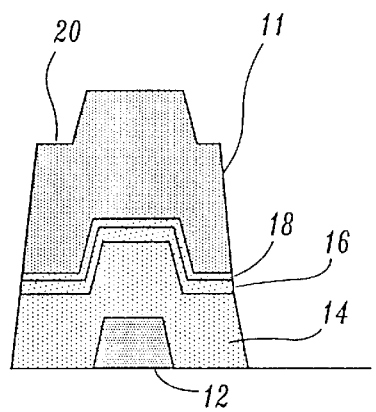
FIG. 8A　　FIG. 8B
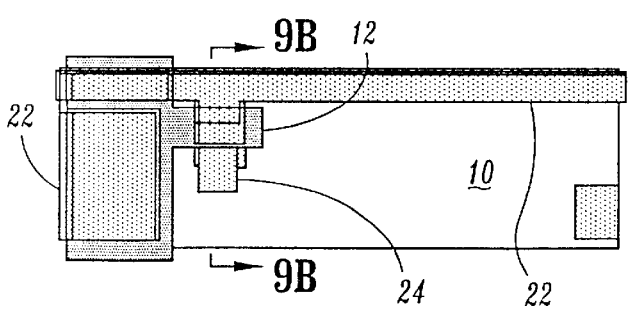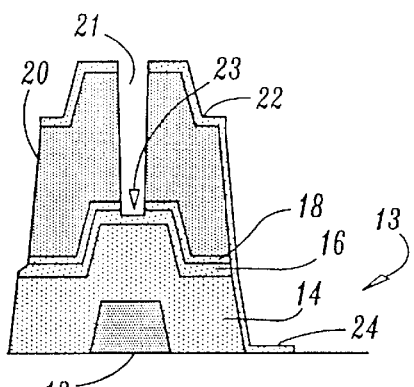
FIG. 9A　　FIG. 9B

THIN FILM TRANSISTORS WITH SELF-ALIGNED TRANSPARENT PIXEL ELECTRODE

This is a divisional of copending application Ser. No. 09/730,218, filed Dec. 5, 2000. Now U.S. Pat. No. 6,511,869.

BACKGROUND OF THE INVENTION

1. Field of the Invention

The present invention relates to display devices, and more particularly to a method for fabricating a transparent conducting electrode by employing a back exposure and a negative tone photoresist to reduce the number of full lithography steps and provide symmetric self alignment of a pixel electrode to a pixel in a thin film transistor array.

2. Description of the Related Art

In active matrix liquid crystal displays (AMLCDs), there is a strong economic incentive to reduce the number of photo processing steps and to improve the performance of thin film transistor (TFT) arrays. One way of improving the performance is to employ an insulating transparent planarizing polymer film (which may be photoimageable) to separate pixel electrodes from a substrate which includes the TFT's and associated wiring (see, e.g., U.S. Pat. No. 5,612,799, entitled: ACTIVE MATRIX TYPE ELECTRO-OPTICAL DEVICE, U.S. Pat. No. 5,780,871, entitled: TFT STRUCTURE INCLUDING A PHOTO-IMAGEABLE INSULATING LAYER FOR USE WITH LCDS AND IMAGE SENSORS, and U.S. Pat. No. 5,585,951 ACTIVE MATRIX SUBSTRATE). The approach described in these patents has the advantage of permitting the pixel electrode to overlap addressing lines since the planarizing material acts as an electrical insulator and reduces the capacitive coupling (if it is sufficiently thick). This, in turn, permits a higher aperture ratio, which is useful, but it does not significantly reduce the TFT array processing cost since there is no reduction in the number of photo processing steps needed. The number of photo processing steps typically needed is 5 with a planarizing polymer (see e.g., Sakamoto et al. pp. 681–684 SID '96 Digest, Zhong et al. pp. 971–974 SID '98 Digest, and Nakabu et al., pp. 732–735 SID '99 Digest). In all such processes, the final two steps pattern the planarizing polymer and the transparent conducting electrode material.

It is necessary in TFT array processing that the pixel electrode be well aligned to the data (also called signal) lines so that capacitive coupling between the pixel electrode and the data line are equal (symmetric) on each side. This permits the use of an appropriate drive inversion scheme, such as a dot inversion, to ensure that the image quality is not degraded by "cross-talk" (i.e., un-canceled capacitive coupling) between the data lines and the pixel electrode.

Therefore, a need exists for a method for fabricating a display device, which provides improved alignment between pixel electrodes and addressing lines, and reduces the number of photo processing steps needed to fabricate such a device.

SUMMARY OF THE INVENTION

A pixel cell is provided having a thin film transistor structure formed on a substrate and addressing lines (e.g., gate and data (signal) lines) patterned on the thin film transistor structure. A first patterned layer of a transparent conductive material covers the data (signal) line and is used to pattern the data metal and a doped silicon layer to form a channel region by performing a channel region etch of a back channel etch (BCE) type TFT. A dielectric layer or layers are formed over the pixel cell, and a via hole is patterned down to the first patterned layer of the transparent conductive material. A second layer of transparent conductive material extends through the via hole to contact the first patterned layer wherein the second layer is self-aligned to the transistor structure. The self-alignment is preferably achieved by a back exposure of a negative tone photoresist.

In alternate embodiments, the first patterned layer of transparent conductor material may include a landing portion to provide a connection to the second layer of transparent conductor material through the via hole. The landing portion may be formed on a transparent material. The transparent material may include the substrate. The transistor structure may include a gate dielectric layer and the landing portion may be formed on the gate dielectric layer. The second layer of transparent conductive material may be patterned to form a pixel electrode of a liquid crystal display cell. The transistor structure may be opaque to provide the self-alignment of the second layer of transparent conductive material by a back-exposure operation. The transistor structure may include a back channel etch-type transistor.

A method for forming a pixel cell, includes the steps of forming a thin film transistor structure on a substrate, patterning a signal line which connects to the thin film transistor structure, patterning a first transparent conductor layer which connects to the signal line, depositing a dielectric layer over the pixel cell, forming a via hole in the dielectric layer which exposes a portion of the first transparent conductor layer, depositing a second transparent conductor layer on the dielectric layer and in the via hole to connect the second transparent conductor layer to the first transparent conductor layer, and patterning the second transparent conductor layer to form a pixel electrode.

In other methods, the step of patterning the second transparent conductor layer may include the steps of forming a resist on the second transparent conductor layer and back-exposing the resist by employing the transistor structure as a photo mask. The method may include the step of front exposing the resist layer to pattern other portions of the second transparent conductor layer. The step of patterning the second transparent conductor layer may include the steps of forming a resist on the second transparent conductor layer and front exposing the resist by employing a photo mask. The step of forming a thin film transistor structure on a substrate may include the steps of forming a gate metal on the substrate, forming a gate dielectric layer over the gate metal, and forming a semiconductor layer on the gate dielectric. The first conductive layer may include a landing portion formed on the gate dielectric layer and the step of depositing the second transparent conductor layer on the dielectric layer and in the via hole may include connecting the landing portion of the first conductor layer with the second conductor layer. The method may include the step of forming ohmic contacts in the semiconductor layer. The first conductive layer may include a landing portion formed on the substrate and the step of depositing the second transparent conductor layer on the dielectric layer and in the via hole may include connecting the landing portion of the first conductor layer with the second conductor layer. The step of patterning a first transparent conductor layer may include the steps of patterning a gap in the first transparent conductor layer over the signal line, and etching the signal line in the gap. The signal line may be formed on the thin film transistor structure and the thin film transistor structure may include a semiconductor layer and an ohmic contact layer formed on the semiconductor layer, and the step of etching the signal line in the gap may include the step of etching through the signal line, through the ohmic contact layer and into the semiconductor region to form a channel region of the thin film transistor structure.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein:

FIG. 1A is a top view of a pixel cell showing a gate metal formed on a substrate in accordance with the present invention;

FIG. 1B is a cross-sectional view taken at section line 1B—1B in accordance with the present invention;

FIG. 2A is a top view of the pixel cell of FIG. 1A showing a gate dielectric, semiconductor layer, ohmic contact layer (doped silicon) and a data metal formed and patterned in accordance with the present invention;

FIG. 2B is a cross-sectional view taken at section line 2B—2B in accordance with the present invention;

FIG. 3A is a top view of the pixel cell of FIG. 2A showing a first transparent conductor formed and patterned in accordance with the present invention;

FIG. 3B is a cross-sectional view taken at section line 3B—3B in accordance with the present invention;

FIG. 7A is a top view of a pixel cell showing a gate metal formed on a substrate in accordance with the present invention;

FIG. 7B is a cross-sectional view taken at section line 1B—1B in accordance with the present invention;

FIG. 8A is a top view of the pixel cell of FIG. 7A showing a gate dielectric, semiconductor layer, ohmic contact layer (doped silicon) and a data metal formed and patterned in accordance with the present invention;

FIG. 8B is a cross-sectional view taken at section line 8B—8B in accordance with the present invention;

FIG. 9A is a top view of the pixel cell of FIG. 8A showing a first transparent conductor formed and patterned in accordance with the present invention;

FIG. 9B is a cross-sectional view taken at section line 9B—9B in accordance with the present invention;

DETAILED DESCRIPTION OF PREFERRED EMBODIMENTS

Figure 4A:
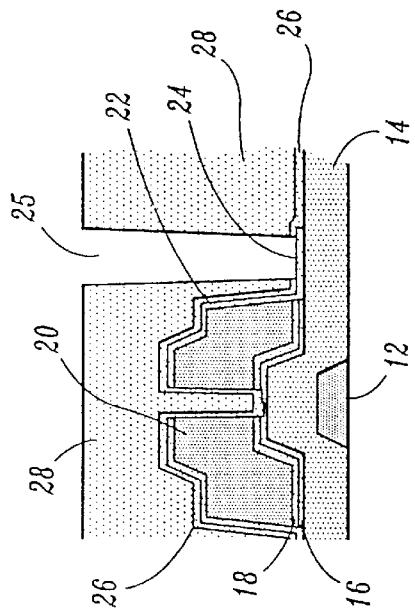
FIG. 4A is a top view of the pixel cell of FIG. 3A showing dielectric layers forming a via hole down to the first transparent conductor formed on a gate dielectric layer in accordance with the present invention.

The present invention patterns a transparent conducting electrode by preferably employing a back exposure and a negative tone photoresist, which remains where exposed in an array region. By using the back exposure method, the number of full lithography steps is reduced and self alignment of the transparent electrode (pixel electrode) to signal lines further improves performance since the coupling of the signals from data lines into the pixel electrode will be more symmetric since there is no possibility of misalignment which would result in stronger coupling on one side then the other. The present invention is preferably employed in liquid crystal displays (LCDs), for example, active matrix liquid crystal displays (AMLCDs).

A back-side exposure to self align a transparent conductor pattern in an array region of a display device has been described by one of the inventors in Japanese Technical Bulletin No. JA8-97-0635 by Tsujimura et al. of IBM, Inc. This process needed an additional front side exposure with a mask in the array area so that the transparent electrode material would remain over the opaque conductor exposed by the via hole thereby electrically connecting the pixel electrode to the TFT array. The present invention provides a thin film transistor (TFT) array process flow which employs two transparent conductor layers so that just one back side exposure in the array can be used. Advantageously, no additional front side exposure with a mask in the array area is needed.

The methods of the present invention make use of a transparent electrode for the TFT-liquid crystal display (LCD) array by patterning the transparent electrode using ultraviolet (UV) exposure from the backside of the substrate to a negative resist formed on the front side of the substrate. A photo mask is preferably employed to conceal the peripheral blank space (areas surrounding the pixel/TFT array) during the back-side exposure. The methods of the present invention enable the very precise alignment of transparent electrode to the data line and to the gate line, and wide aperture ratios for pixels can be obtained. As the peripheral area is not exposed because of the photo mask, extra steps to remove the second transparent conductor from the peripheral space are not needed.

Referring now in detail to the figures in which like numerals represent the same or similar elements and initially to FIGS. 1A and 1B, a process flow is shown for one illustrative embodiment of the present invention. A substrate 10 includes a transparent material such as, for example, glass, a polymer, or other suitable substrate materials. A gate metal 12 is deposited and patterned on substrate 10. Gate metal 12 may include one or more conductive layers, which may include, for example, aluminum, molybdenum, Al(Nd), etc. Patterning of gate metal 12 is preferably performed by photolithography and etch processes.

Referring to FIGS. 2A and 2B, a deposition of a gate insulator 14, an amorphous Si layer 16, an N+ doped Si layer 18, and a data metal 20 are performed. Gate insulator 14 preferably includes silicon dioxide and/or silicon nitride. Layer 16 will form an active channel region of a thin film transistors device while layer 18 will form ohmic source and drain contacts of a thin film transistor 13 (See FIG. 3B). Data metal 20 preferably include aluminum, molybdenum or other suitable materials for use as an addressing line.

A second photolithography process is employed to provide an etch mask of photoresist. Wet etching and dry etching are performed to pattern stack of layers (i.e., layers 16 and 18, and data metal 20) down to gate insulator 14, as shown in FIG. 2B.

Referring to FIGS. 3A and 3B, a first transparent conductor layer 22 is then deposited. Conductive layer 22 preferably includes indium tin oxide (ITO) although other transparent conductors may be employed as well, for example indium zinc oxide (IZO). A third photolithography process is employed to form an etch mask for etching conductive layer 22 along with data metal 20 and N+ doped Si 18. A gap 21 is etched through data metal 20 and layer 18 which terminates on or in layer 16. This gap 21 separates source and drain portions of layer 18 and forms a channel region 23 therebetween which conducts in accordance with applied voltage to gate metal 12. A portion 24 of transparent conductive layer 22 extends beyond data metal 20. Portion 24 will be employed as a landing for a pixel contact as will be described below. Note that there is no gate metal, data metal or other opaque material under landing portion 24. A back channel etch-type (BCE) TFT device is now formed.

Figure 4B:
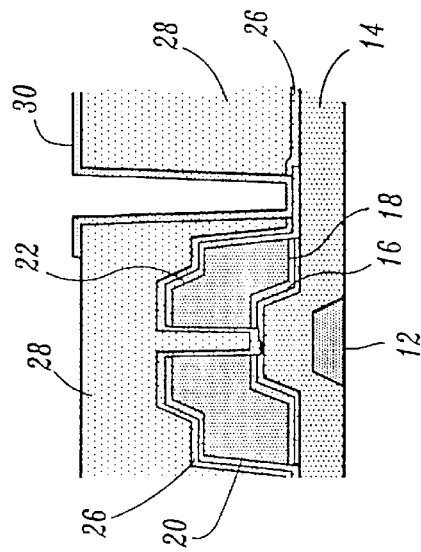
FIG. 4B is a cross-sectional view taken at section line 4B—4B in accordance with the present invention.

Referring to FIGS. 4A and 4B, a dielectric layer 26, e.g., silicon nitride may optionally be deposited. Layer 26, if present, is employed as an inorganic dielectric ion barrier layer. A transparent polymer layer 28, for example, an acrylic resin based material, such as, PC 403, available commercially from JSR, FZT-S100, available commercially from Fujifilm Olin, or, TPAR series, available commercially from Tokyo Oka, is deposited. Insulation layer 26 may include, for example, silicon nitride, silicon oxide or other inorganic insulators. Insulator layer 28 may include, for example, an acrylic polymer, polyamide, a transparent polymer or a colored polymer. Transparent polymer layer 28 may be photosensitive in which case a photoresist is not needed to pattern layer 28. Polymer layer 28 and layer 26, if present, are patterned to open a via 25 to expose portion 24 of first transparent conductor layer 22, which acts as an etch stop. A second via 29 is also formed to connect pixel electrode 23 to a storage capacitor formed on a gate line (gate metal 12) of an adjacent pixel (not shown). Via 29 is only needed if a storage-capacitor-on-gate type design is employed. Gate insulator 14 may be etched to expose gate metal 12 in areas outside the TFT array where it may be desirable to form electrical contacts between gate metal 14 and data metal 20 with second transparent conductor layer 30.

Figure 6A:
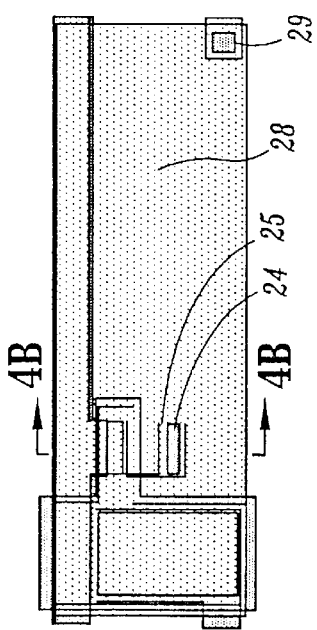
FIG. 6A is a top view of the pixel cell of FIG. 5B showing the resist layer removed and a second transparent conductor layer patterned to form a self-aligned pixel electrode in accordance with the present invention.
Figure 6B:
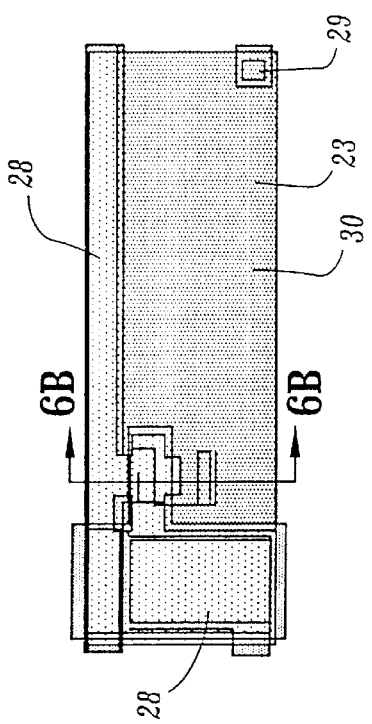
FIG. 6B is a cross-sectional view taken at section line 6B—6B in accordance with the present invention.
Figure 5A:
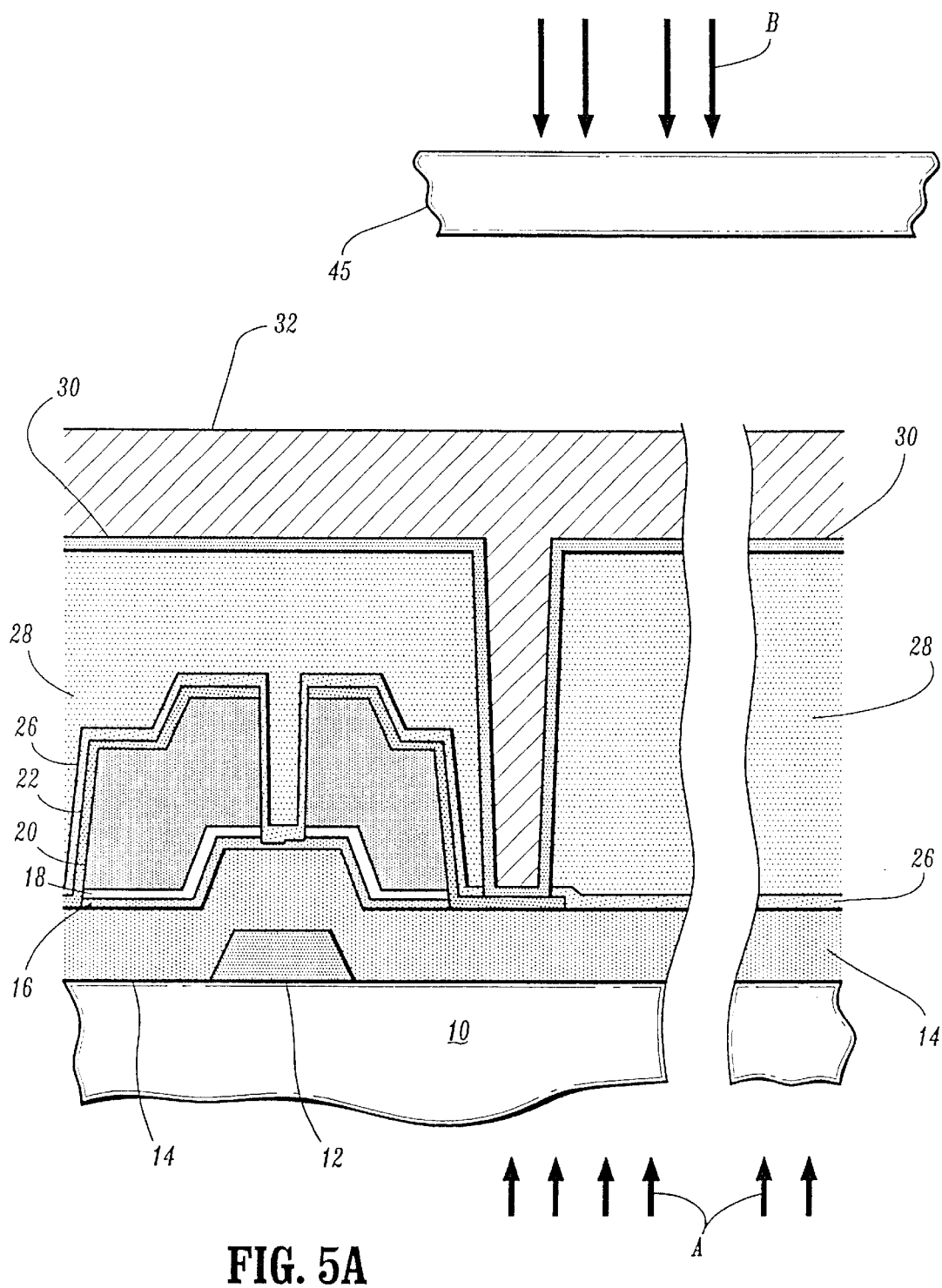
FIG. 5A is a cross-sectional view of the pixel cell of FIG. 4A showing a second transparent conductor material formed in contact with the first transparent conductor layer and a negative resist being back exposed and optionally front exposed in accordance with the present invention.
Figure 5B:
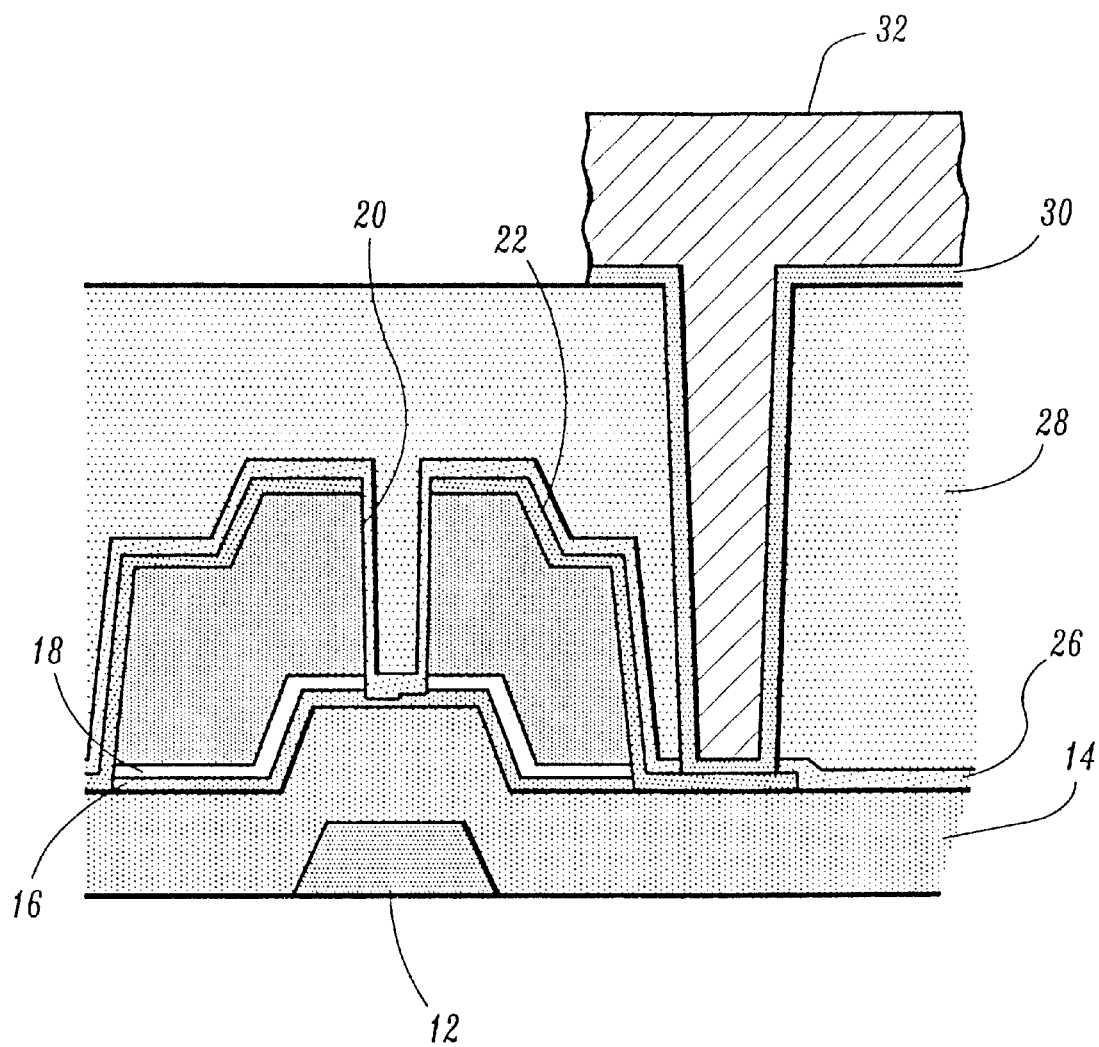
FIG. 5B is a cross-sectional the pixel cell of FIG. 5A showing the resist layer developed and the second transparent conductor etched in accordance with the present invention.

Referring to FIGS. 5A and 5B, a second transparent conductor layer 30 is deposited and patterned in the array area. As shown in FIGS. 5A and 5B, a negative resist 32 and back exposure (exposure light in the direction of arrow "A") are preferably employed to form a self-aligned pixel electrode 23 (FIG. 6A). Negative resist 32 is preferably coated by a spin coater. If no connections are needed between gate metal 12 and data metal 20 outside the array, that area is just masked by a photo mask or shutter (not shown) during the back exposure. Ultra-violet (UV) Light is exposed from a back side and negative resist is cross-linked after baking. After developing in a developer rinse, transparent conductor layer 30 is etched (FIG. 5B). The photoresist is then stripped as shown in FIGS. 6A and 6B. As the overlap between pixel electrode 23 formed from layer 30 and data line 20 is uniform and symmetric, the image quality is improved as uncompensated cross-talk is reduced. The amount of overlap can be controlled by the back exposure time and the degree of collimation of the exposure light source.

If connections are needed between gate and data metals outside the array region, an additional masked exposure, using a photo mask 45, from the front side (e.g., light in the direction of arrow "B" in FIG. 5A) can be used to pattern second transparent conductor layer 30 outside the array area. Alternately, a combination of a backside exposure and masked front side exposure may be employed, or a backside exposure in a limited area outside the array region (avoiding the bond pads for example, which would be shorted together by ITO if only a backside exposure were used).

Referring to FIGS. 7A and 7B, another process flow is shown for another illustrative embodiment of the present invention. Substrate 10 includes a transparent material such as, for example, glass, a polymer, or other suitable substrate materials. Gate metal 12 is deposited and patterned on substrate 10. Gate metal 12 may include one or more conductive layers, which may include, for example, aluminum, molybdenum, Al(Nd), etc. Patterning of gate metal 12 is preferably performed by photolithography and etch processes.

Referring to FIGS. 8A and 8B, a deposition of gate insulator 14, amorphous Si layer 16, N+ doped Si layer 18, and data metal 20 are performed. Photolithography, wet etching and dry etching are employed to pattern this whole stack down to gate metal 12. It is desirable to use processes which will provide a somewhat tapered sidewall 11 on the etched layers to ensure adequate step coverage by a thin transparent conductor layer 22 (see FIG. 9B). Gate insulator 14 preferably includes silicon dioxide and/or silicon nitride. Layer 16 will form active channel regions of the thin film transistor devices while layer 18 will form ohmic source and drain contacts of thin film transistor 13 (FIG. 9B). Data metal 20 preferably includes aluminum, molybdenum or other suitable materials for use as an addressing line.

Referring to FIGS. 9A and 9B, a first transparent conductor layer 22 is then deposited, for example, by sputtering. Transparent conductive layer 22 preferably includes indium tin oxide (ITO) although other transparent conductors may be employed as well, for example indium zinc oxide (IZO). A third photolithography process is employed to form an etch mask of photoresist for etching conductive layer 22 along with data metal 20 and N+ doped Si 18. A gap 21 is etched through data metal 20 and layer 18 which terminates on or in layer 16. This gap 21 separates source and drain portion of layer 18 and forms a channel region 23 therebetween which conducts in accordance with applied voltage to gate metal 12. A portion 24 of transparent conductive layer 22 extends beyond data metal 20. Portion 24 will be employed as a landing for a pixel contact as will be described below. Note that gate and data metals (12 and 20, respectively) can be directly connected by the first transparent conductor layer 22. A back channel etch-type (BCE) TFT device 13 is now formed.

Figure 10A:
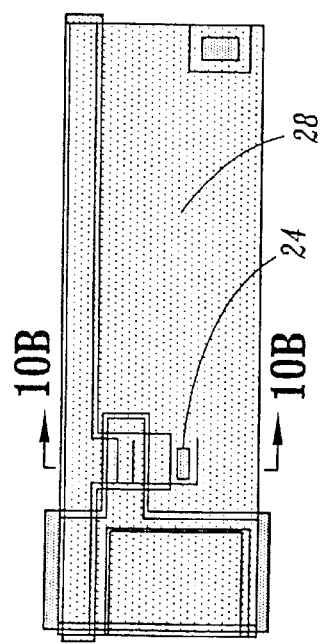
FIG. 10A is a top view of the pixel cell of FIG. 10A showing dielectric layers forming a via hole-down to the first transparent conductor formed on the substrate in accordance with the present invention.
Figure 10B:
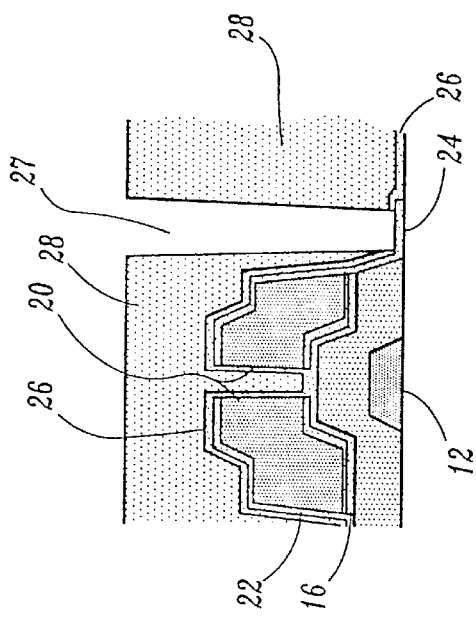
FIG. 10B is a cross-sectional view taken at section line 10B—10B in accordance with the present invention.

Referring to FIGS. 10A and 10B, a dielectric layer 26, e.g., silicon nitride may optionally be deposited. Layer 26, if present, is employed as an inorganic dielectric ion barrier layer. A transparent polymer layer 28, for example an acrylic resin based material, such as, PC 403, available commercially from JSR, FZT-S100, available commercially from Fujifilm Olin, or, TPAR series, available commercially from Tokyo Oka, is deposited. Insulator layer 26 may include, for example, silicon nitride, silicon oxide, or other inorganic insulators. Insulator layer 28 may include, for example, an acrylic polymer, polyamide, a transparent polymer or a colored polymer. Transparent polymer layer 28 may be photosensitive, in which case, a photoresist is not needed to pattern layer 28. Polymer layer 28 and layer 26, if present, are patterned to open a via 27 to expose portion 24 of first transparent conductor layer 22, which acts as an etch stop. A second via 29 is also formed to connect pixel electrode 23 to a storage capacitor formed on a gate line (gate metal 12) of an adjacent pixel (not shown). Via 29 is only needed if a storage-capacitor-on-gate type design is employed.

Figure 12A:
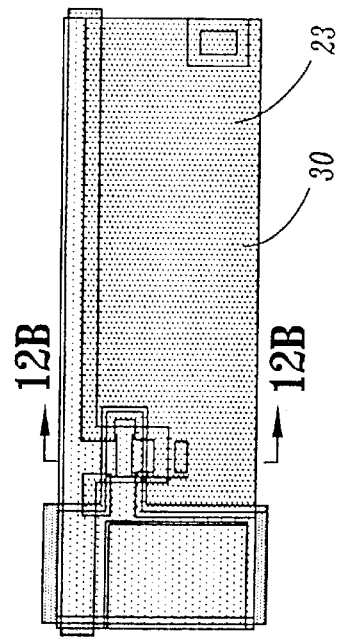
FIG. 12A is a top view of the pixel cell of FIG. 11B showing the resist layer removed and a second transparent conductor layer patterned to form a self-aligned pixel electrode in accordance with the present invention.
Figure 12B:
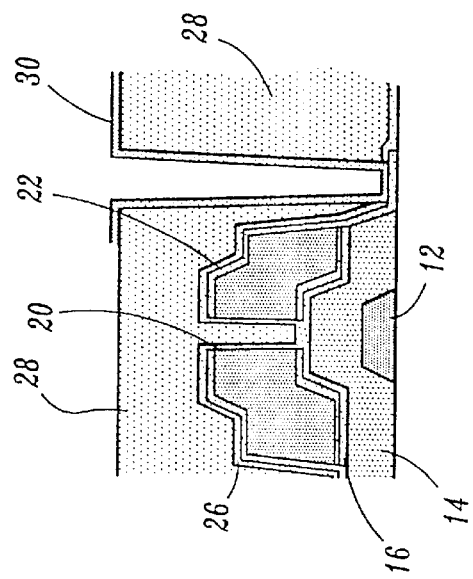
FIG. 12B is a cross-sectional view taken at section line 12B—12B in accordance with the present invention.
Figure 11A:
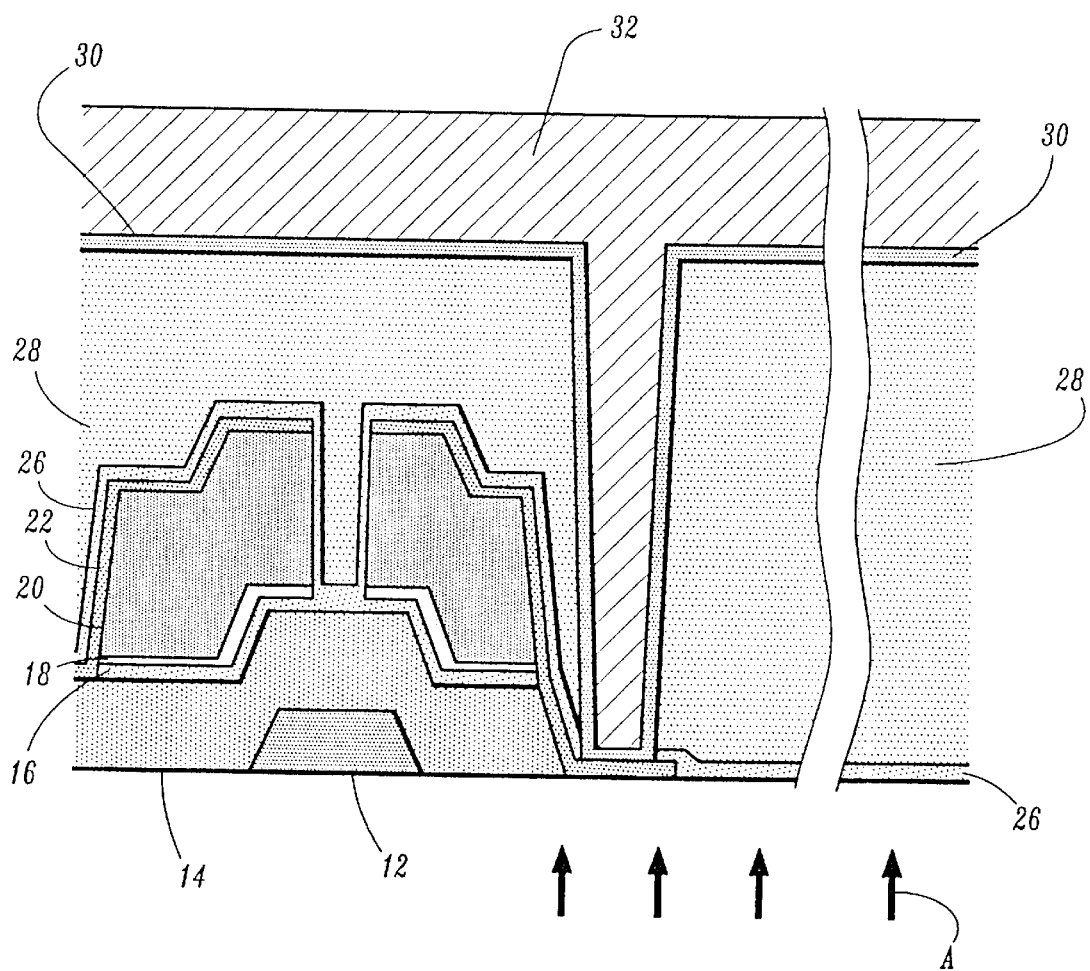
FIG. 11A is a cross-sectional view of the pixel cell of FIG. 10A showing a second transparent conductor material formed in contact with the first transparent conductor layer and a negative resist being back exposed in accordance with the present invention.
Figure 11B:
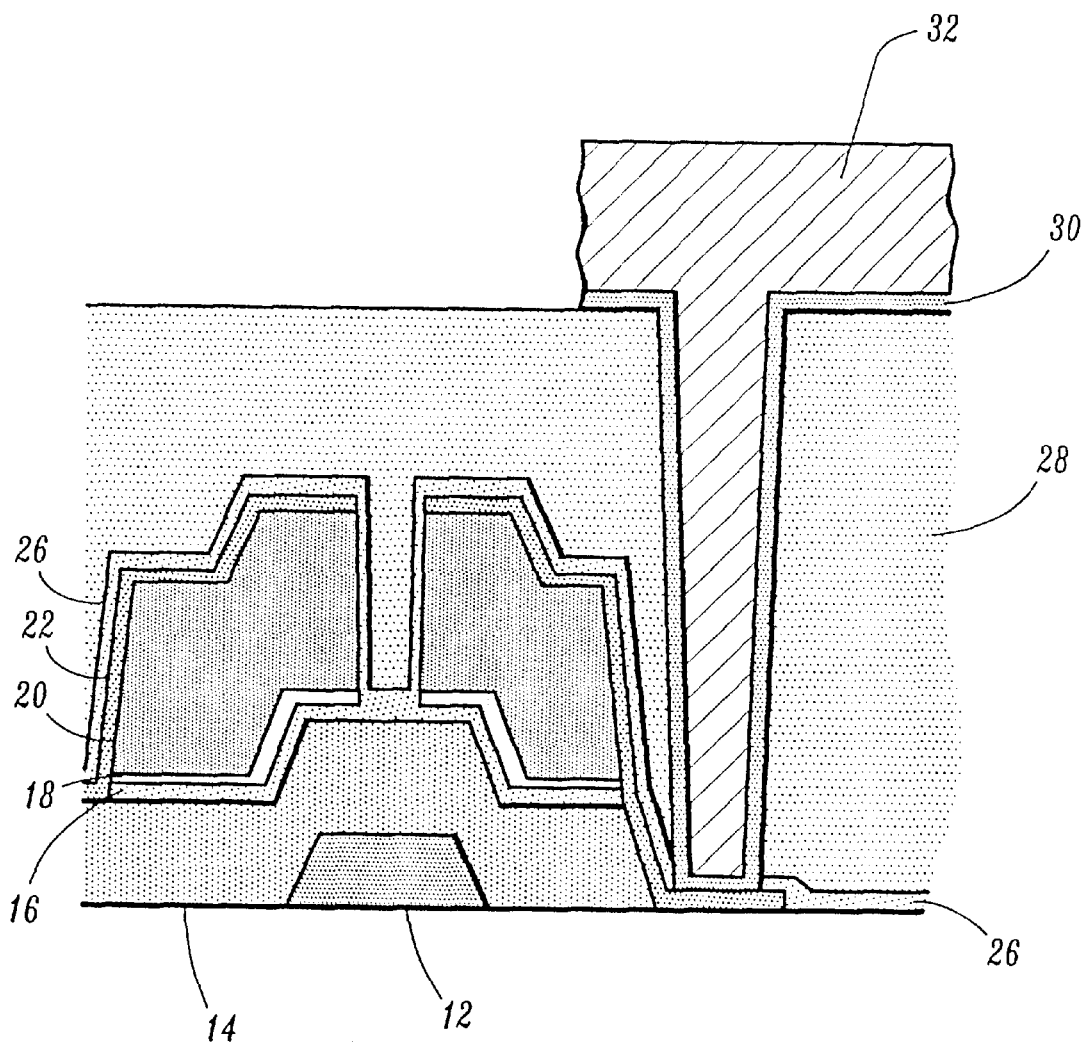
FIG. 11B is a cross-sectional the pixel cell of FIG. 10A showing the resist layer developed and the second transparent conductor etched in accordance with the present invention.

Referring to FIGS. 11A and 11B, a second transparent conductor layer 30 is deposited and patterned in the array area using a negative resist 32 and back exposure (exposure light in the direction of arrow "A". Negative resist 32 is preferably coated by a spin coater. Ultra-violet (UV) light is exposed from a back side and negative resist is cross-linked after baking. After developing in a developer rinse, conductor layer 30 is etched. The photoresist is then stripped, as shown in FIGS. 12A and 12B. As the overlap between pixel electrode 23 formed from layer 30 and data line 20 is uniform and symmetric, the image quality is improved as uncompensated cross-talk is reduced. The amount of overlap can be controlled by the back exposure time and the degree of collimation of the exposure light source.

Since connections between gate metal 12 and data metal 20 outside the array can be formed by first transparent conductive layer 22, the connection areas are just masked by a photo mask or shutter (not shown) during the back exposure so that no second transparent layer 30 is present in those areas.

Advantageously, the present invention employs processes which use four full lithography steps and one back exposure in an array region to build a TFT array with a transparent pixel electrode 23 on a planarizing polymer. The process flows permit connections between the gate and signal (data) metal outside the array region by either using the first transparent conductor layer (e.g., ITO or other transparent conductors) or the second transparent conductor layer (e.g., ITO or other transparent conductors). As illustratively described, with reference to FIGS. 1–6, connections between the gate metal and data metal outside the array region are made through the second transparent conductive layer 30. If no additional mask is used outside the array area, the data and gate metal are formed in correct shapes to result in a desired location of the second transparent conductive layer 30 so that only a back exposure is needed to pattern the second transparent conductive layer 30. Data metal 20 and transistor materials (layers 16 and 18) and gate metal 12 are opaque to permit these structures to be used as a photo mask to pattern resist 32 in a back exposure process. Data metal. 20 is connected to first transparent conductor 22, which is connected to second transparent conductor 30, which is, in turn, connected to gate metal 12. The connection between second transparent conductor 30 to gate metal 12 takes advantage of the fact that the back exposure process can result in a slight overlap of transparent conductor 30 over an edge of gate metal 12. The second illustrative process flow, as shown in FIGS. 7–12, permits the gate 12 and data metal 20 to be directly connected by the first transparent conductive layer 22.

Having described preferred embodiments of thin film transistors with self-aligned transparent pixel electrode (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A pixel cell comprising:
    a thin film transistor structure formed on a substrate;
    a signal conductor patterned on the thin film transistor structure;
    a first patterned layer of a transparent conductive material that covers the signal conductor, the first patterned layer providing a pattern employed in etching a channel region of the thin film transistor structure;
    a dielectric layer formed over the pixel cell and including a via hole down to the first patterned layer of the transparent conductive material; and
    a second layer of transparent conductive material that extends through the via hole to contact the first patterned layer wherein the second layer is self-aligned to the transistor structure.

2. The cell as recited in claim 1, wherein the first patterned layer of transparent conductor material includes a landing portion to provide a connection to the second layer of transparent conductor material through the via hole.

3. The cell as recited in claim 2, wherein the landing portion is formed on a transparent material.

4. The cell as recited in claim 3, wherein the transparent material includes the substrate.

5. The cell as recited in claim 2, wherein the transistor structure includes a gate dielectric layer and the landing portion is formed on the gate dielectric layer.

6. The cell as recited in claim 1, wherein the second layer of transparent conductive material is patterned to form a pixel electrode of a liquid crystal display cell.

7. The cell as recited in claim 1, wherein the transistor structure is opaque to provide the self-alignment of the second layer of transparent conductive material by a back-exposure operation.

8. The cell as recited in claim 1, wherein the transistor structure includes a back channel etch-type transistor.

9. A pixel cell comprising:
    a thin film transistor structure formed over a substrate;
    a signal conductor formed over the thin film transistor structure;
    a first transparent conductive material layer formed over the signal conductor;
    a dielectric layer formed over the first transparent conductive material layer, the dielectric layer including a via hole down to the first transparent conductive material layer; and a second transparent conductive material layer formed over the dielectric layer, the second transparent conductive material layer extending through the via hole to contact the first transparent conductive material layer, wherein the second transparent conductive material layer is self-aligned to the transistor structure.

10. The pixel cell of claim 9, wherein the thin film transistor structure includes a drain electrode and a source electrode, and the first transparent conductive material layer is formed over the drain electrode and the source electrode.

11. The pixel cell of claim 9, wherein the first transparent conductive material layer includes a landing portion that extends beyond the signal conductor, the landing portion providing a connection to the second transparent conductive material layer through the via hole.

12. The pixel cell of claim 11, wherein the landing portion is formed on a transparent material.

13. The pixel cell of claim 12, wherein the transparent material includes the substrate.

14. The active matrix display of claim 11, wherein the transistor structure includes a gate dielectric layer and the landing portion is formed on the gate dielectric layer.

15. The active matrix display of claim 9, wherein the second transparent conductive material layer is patterned to form a pixel electrode.

16. The active matrix display of claim 9, wherein the transistor structure is opaque to provide the self-alignment of the second transparent conductive material layer by a back-exposure operation.

17. The active matrix display of claim 9, wherein the transistor structure includes a back channel etch-type transistor.

18. The pixel cell of claim 9, wherein the pixel cell forms part of an active matrix display.

* * * * *